United States Patent
Chen et al.

(10) Patent No.: US 9,083,253 B2
(45) Date of Patent: Jul. 14, 2015

(54) CONTROL CIRCUIT FOR POWER CONVERTING CIRCUIT

(71) Applicant: Richtek Technology Corporation, Chupei, Hsinchu (TW)

(72) Inventors: Isaac Y. Chen, Zhubei (TW); Chien-Fu Tang, Hsinchu (TW); Hsin-Yi Wu, Taipei (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/560,774

(22) Filed: Dec. 4, 2014

(65) Prior Publication Data

US 2015/0162843 A1 Jun. 11, 2015

(30) Foreign Application Priority Data

Dec. 5, 2013 (TW) .............................. 102144715 A (51) Int. Cl.
*H02M 3/335* (2006.01)
*H02M 1/00* (2007.01)

(52) U.S. Cl.
CPC .. *H02M 3/33523* (2013.01); *H02M 2001/0022* (2013.01)

(58) Field of Classification Search
CPC ..... H02M 1/32; H02M 1/4208; H02M 7/217; H02M 2001/0022; H02M 2001/0032; H02M 2001/327
See application file for complete search history.

(56) References Cited

U.S. PATENT DOCUMENTS

| 7,239,532 B1* | 7/2007 | Hsu et al. ................... 363/21.12 |
| 2004/0257839 A1* | 12/2004 | Yang et al. ................ 363/21.12 |
| 2006/0034102 A1* | 2/2006 | Yang et al. ................ 363/21.13 |
| 2008/0259654 A1* | 10/2008 | Huynh et al. .............. 363/21.16 |
| 2008/0259655 A1* | 10/2008 | Wei et al. .................. 363/21.18 |
| 2008/0259659 A1* | 10/2008 | Choi et al. ...................... 363/50 |
| 2009/0267583 A1* | 10/2009 | Hsu et al. ...................... 323/284 |
| 2010/0195355 A1* | 8/2010 | Zheng ........................ 363/21.12 |
| 2010/0208500 A1* | 8/2010 | Yan et al. ................... 363/21.12 |
| 2010/0225293 A1* | 9/2010 | Wang et al. ................... 323/290 |
| 2011/0002147 A1* | 1/2011 | Fukui ......................... 363/21.12 |
| 2011/0157936 A1* | 6/2011 | Huynh ............................ 363/78 |
| 2011/0267015 A1* | 11/2011 | Lu et al. ........................ 323/235 |
| 2011/0292704 A1* | 12/2011 | Makino et al. ................. 363/126 |
| 2012/0008345 A1* | 1/2012 | Tang et al. .................. 363/21.15 |
| 2012/0033459 A1* | 2/2012 | Chang et al. ................ 363/21.18 |
| 2012/0155122 A1* | 6/2012 | Tang et al. .................. 363/21.15 |
| 2012/0170326 A1* | 7/2012 | Yang .......................... 363/21.12 |
| 2012/0176820 A1* | 7/2012 | Li et al. ...................... 363/21.12 |

(Continued)

*Primary Examiner* — Timothy J Dole
*Assistant Examiner* — Yusef Ahmed
(74) *Attorney, Agent, or Firm* — Birch, Stewart, Kolasch & Birch, LLP (57) ABSTRACT

A control circuit for a power converting circuit includes a multifunctional pin, a pulse-width-modulation (PWM) signal generating circuit, a voltage detecting circuit and a zero current detecting circuit. The voltage detecting circuit detects a signal on the multifunctional pin. When the signal on the multifunctional pin is greater than a predetermined value, the voltage detecting circuit configures the PWM signal generating circuit to intermittently conduct a current switch of the power converting circuit. The zero current detecting circuit detects the signal of the multifunctional pin to determine the conduction status of the current switch. When the signal of the multifunctional pin is less than the predetermined value, the voltage detecting circuit configures the PWM signal generating circuit to turn off the current switch.

6 Claims, 5 Drawing Sheets

(56) References Cited

U.S. PATENT DOCUMENTS

| | | | |
|---|---|---|---|
| 2013/0083562 A1* | 4/2013 | Wu et al. | 363/16 |
| 2013/0107584 A1* | 5/2013 | Li et al. | 363/21.12 |
| 2013/0294118 A1* | 11/2013 | So et al. | 363/21.16 |
| 2014/0016378 A1* | 1/2014 | Ke et al. | 363/21.18 |
| 2014/0071717 A1* | 3/2014 | Murata | 363/21.17 |
| 2014/0153292 A1* | 6/2014 | Yan et al. | 363/21.01 |
| 2015/0055379 A1* | 2/2015 | Fang | 363/21.17 |

* cited by examiner

CONTROL CIRCUIT FOR POWER CONVERTING CIRCUIT

CROSS-REFERENCE TO RELATED APPLICATIONS

This application claims the benefit of priority to Patent Application No. 102144715, filed in Taiwan on Dec. 5, 2013; the entirety of which is incorporated herein by reference for all purposes.

BACKGROUND

The disclosure generally relates to a control circuit for a power converting circuit and, more particularly, to the control circuit with a reduced number of pins of the integrated circuit package.

As the dimensions of the electronic equipment are getting more and more compact, the dimensions of the electronic component within the electronic equipment must be reduced accordingly to fit in the limited space. For example, the integrated circuit elements often need several input pins and output pins for coupling with other circuit elements. Thus, a larger integrated circuit package is needed for having enough number of pins and the dimensions of the die are often far smaller than the dimensions of the package. The large-sized integrated circuit package is not only a waste of material but also cause environmental problems. Moreover, the dimensions of the integrated circuit elements may not be effectively reduced.

In the applications of the power converting circuit, when the control circuit of the power converting circuit is realized with the integrated circuit element. The die size of the control circuit is usually very small compared with the integrated circuit package. However, the control circuit requires a lot of pins for coupling with other circuit elements for configuring the power stage circuit, for receiving the feedback signals, for receiving the operational parameters, etc. Thus, the control circuit of the power converting circuit has to utilize a larger package for having enough number of pins. The flexibility and the dimensions of the control circuit are therefore limited.

Some circuit blocks of the integrated circuit elements may share the pin of the integrated circuit package for reducing the required number of pins and utilizing a smaller package. However, the differences between the circuit elements make it difficult to have a simple design rule for the circuit blocks to share the pin. When the circuit blocks of the integrated circuit elements need to share the pin of the integrated circuit package, it still should be precisely designed to ensure the circuit blocks may function correctly.

SUMMARY

In view of the foregoing, it may be appreciated that a substantial need exists for methods and apparatuses that mitigate or reduce the problems above.

An example embodiment of a control circuit for configuring a power converting circuit is disclosed, wherein the power converting circuit comprises a transformer and a current switch; a primary side of the transformer is configured to operably couple with an input voltage and the current switch; a secondary side of the transformer is configured to operably couple with a load; and the current switch is configured to operably couple with the transformer and a predetermined voltage level, wherein the control circuit comprising: an input voltage pin configured to operably receive the input voltage; a multifunctional pin configured to operably couple with an auxiliary winding side of the transformer; a pulse-width-modulation (PWM) signal generating circuit configured to operably configure a conduction status of the current switch; a low voltage lockdown circuit coupled with the input voltage pin and the PWM signal generating circuit; a voltage detecting circuit coupled with the multifunctional pin and the PWM signal generating circuit; and a zero current detecting circuit coupled with the multifunctional pin and the PWM signal generating circuit; wherein when a magnitude of an input signal detected by the low voltage lockdown circuit on the input voltage pin is greater than a magnitude of a first predetermined value, the PWM signal generating circuit configures the current switch to be not conducted; wherein in a first period of time, when the magnitude of the input signal detected by the low voltage lockdown circuit on the input voltage pin is greater than the magnitude of the first predetermined value, the low voltage lockdown circuit configures the PWM signal generating circuit to configure the current switch to be conducted for a predetermined period of time; and when an auxiliary winding signal detected by the voltage detecting circuit on the multifunctional pin is greater than a second predetermined value, the voltage detecting circuit configures the PWM signal generating circuit to configure the current switch to be intermittently conducted in a second period of time; wherein in the second period of time, when the PWM signal generating circuit configures the current switch to be not conducted, the zero current detecting circuit configures the PWM signal generating circuit to configure the current switch to be conducted when a conduction current of the transformer is less than a predetermined threshold according to the auxiliary winding signal; wherein in the second period of time, when the auxiliary winding signal detected by the voltage detecting circuit on the multifunctional pin is less than a third predetermined value, the voltage detecting circuit configures the PWM signal generating circuit to configure the current switch to be not conducted in a third period of time.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
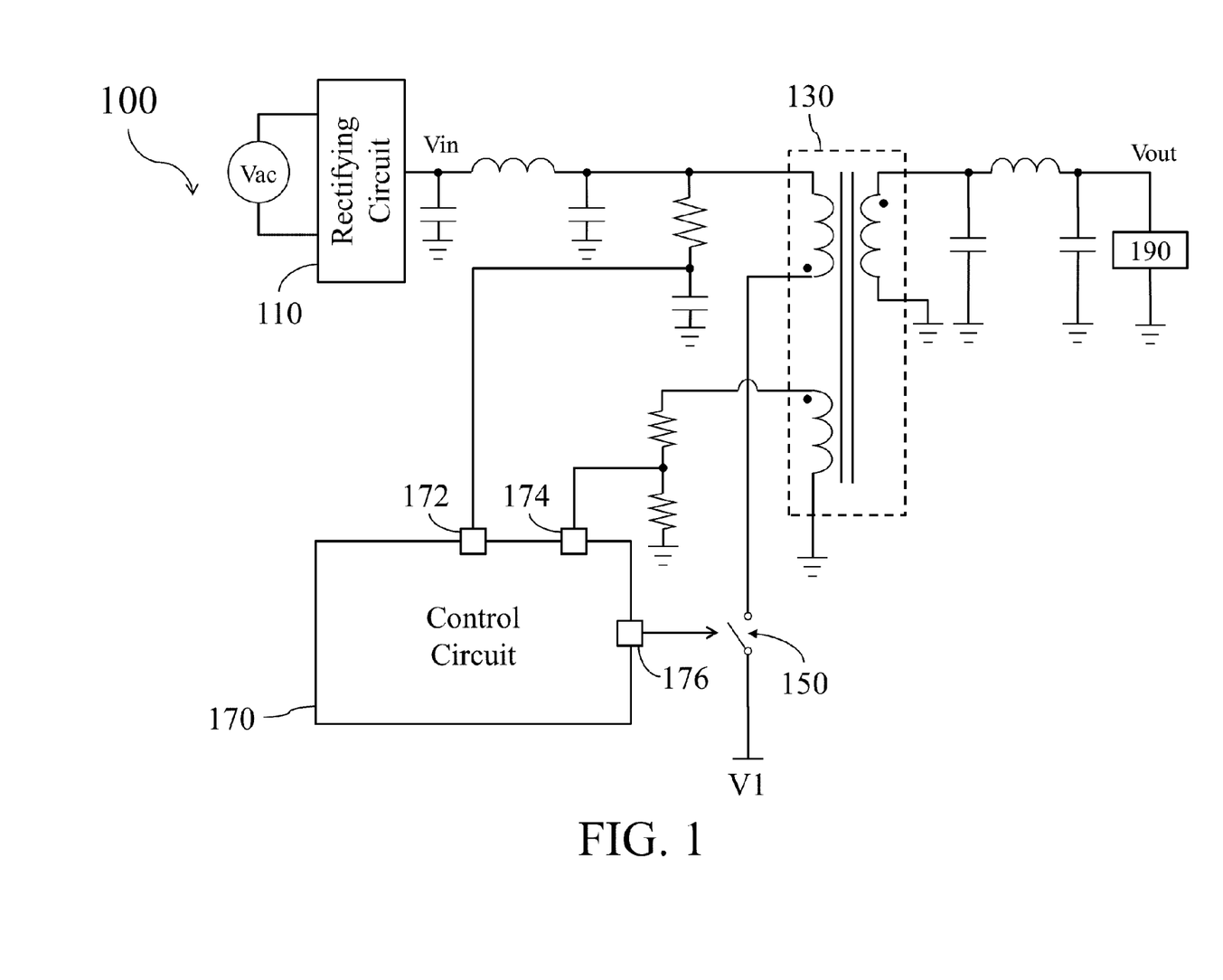
FIG. 1 shows a simplified functional block diagram of a power converting circuit according to one embodiment of the present disclosure.

FIG. 1 shows a simplified functional block diagram of a power converting circuit 100 according to one embodiment of the present disclosure. The power converting circuit 100 comprises a rectifying circuit 110, a transformer 130, a current switch 150 and a control circuit 170 for providing power to a load 190 according to an AC signal Vac. For the purposes of conciseness and clear explanation, some components and connections of the power converting circuit 100 are not shown in FIG. 1.

In this embodiment, the rectifying circuit 110 is configured to rectify the AC signal Vac to a DC input voltage signal Vin, and may be realized with the full bridge rectifying circuit, the half bridge rectifying circuit and other suitable structures of rectifying circuits.

One terminal of a primary side of the transformer 130 is configured to operably couple with the rectifying circuit 110 through capacitors, resistors and other circuit elements. The other terminal of the primary side of the transformer 130 is configured to operably couple with the current switch 150. A secondary side of the transformer 130 is configured to operably couple with the load 190 through capacitors, inductors and other circuit elements.

The current switch 150 is configured to operably couple with the primary side of the transformer 130 and a predetermined voltage level V1. The predetermined voltage level V1 may be configured to be the voltage level of the ground or other suitable voltage level. A control terminal of the current switch 150 is configured to operably couple with the control circuit 170 so that the control circuit 170 may configures the current switch 150 to be conducted or not conducted. The current switch 150 may be realized with the BJT, the FET, and/or other suitable circuit elements.

In this embodiment, the control circuit 170 is realized with an integrated circuit element, and the integrated circuit package of the control circuit 170 comprises an input voltage pin 172, a multifunctional pin 174 and a switch control pin 176. The input voltage pin 172 receives the input voltage signal Vin through resistors, inductors, capacitors and other circuit elements. The multifunctional pin 174 is configured to operably couple with an auxiliary winding side of the transformer 130 through a voltage dividing circuit realized with resistors. The switch control pin 176 is configured to operably couple with the control terminal of the current switch 150.

Figure 2:
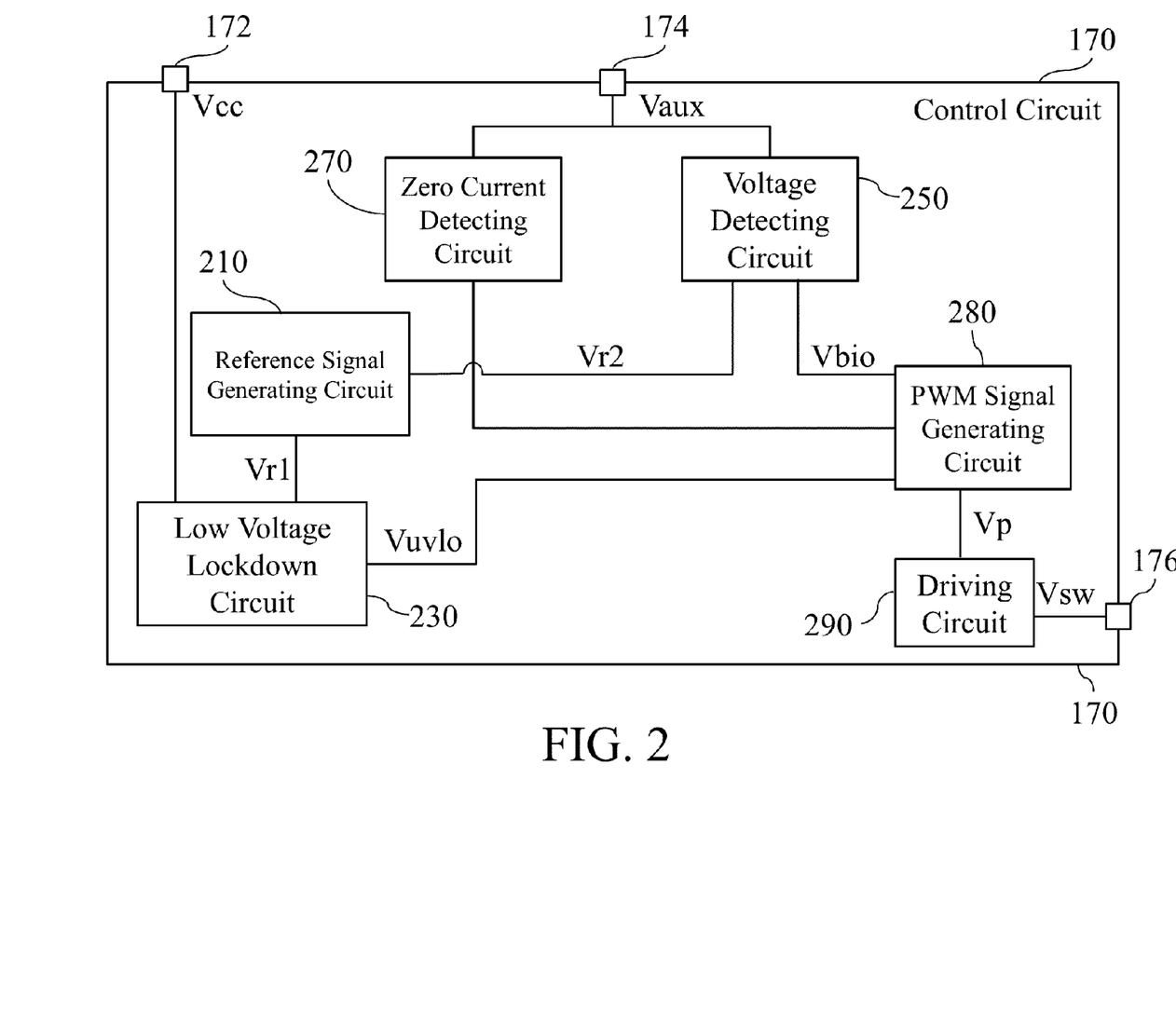
FIG. 2 shows a simplified functional block diagram of the control circuit in FIG. 1 according to one embodiment of the present disclosure.

FIG. 2 shows a simplified functional block diagram of the control circuit 170 in FIG. 1 according to one embodiment of the present disclosure. The control circuit 170 further comprises a reference signal generating circuit 210, a low voltage lockdown circuit 230, a voltage detecting circuit 250, a zero current detecting circuit 270, a pulse-width-modulation (PWM) signal generating circuit 280 and a driving circuit 290. For the purposes of conciseness and clear explanation, some components and connections of the control circuit 170 are not shown in FIG. 2.

The reference signal generating circuit 210 is configured to operably generate suitable reference signals so that other circuit blocks may operate accordingly. The reference signal generating circuit 210 may generate the reference signals in the voltage form and/or in the current form according to different design considerations.

The low voltage lockdown circuit 230 is configured to operably couple with the input voltage pin 172 for detecting whether the input voltage signal Vin locates in a suitable voltage range. In this embodiment, the low voltage lockdown circuit 230 may generate a low voltage lockdown signal Vuvlo according to the input signal Vcc on the input voltage pin 172 and a first reference signal Vr1 generated by the reference signal generating circuit 210. Thus, the PWM signal generating circuit 280, the driving circuit 290 and other circuit blocks may enter the operation mode according to the low voltage lockdown signal Vuvlo.

The voltage detecting circuit 250 is configured to operably couple with the multifunctional pin 174 and determined whether the driving circuit 290 and other circuit blocks should enter the operation mode according to an auxiliary winding signal Vaux detected on the multifunctional pin 174. In this embodiment, the voltage detecting circuit 250 generates a voltage detecting signal Vbio according to the auxiliary winding signal Vaux detected on the multifunctional pin 174 and a second reference signal Vr2 generated by the reference signal generating circuit 210. Thus, the PWM signal generating circuit 280 may generate a suitable modulation signal Vp according to the voltage detecting signal Vbio for configuring the driving circuit 290 to configure the conduction status of the current switch 150.

The zero current detecting circuit 270 is configured to operably couple with the multifunction pin 174. When the current switch 150 is not conducted, the zero current detecting circuit 270 detects the auxiliary winding signal Vaux on the multifunctional pin 174 so as to configure the PWM signal generating circuit 280 to generate the suitable modulation signal Vp for configuring the driving circuit 290 to configure the conduction status of the current switch 150. The zero current detecting circuit 270 may be realized with any suitable circuit structure. For example, in one embodiment, the zero current detecting circuit 270 performs signal processing operations according to the auxiliary winding signal Vaux. Thus, when an induction current of the transformer 130 is less than a predetermined threshold (e.g., the inductor current is zero or other suitable value), the PWM signal generating circuit 280 may configure the modulation signal Vp to be active so as to configure the driving circuit 290 to configure the current switch 150 to be conducted. In other embodiments, the zero current detecting circuit 270 may periodically configure the PWM signal generating circuit 280 to configure the modulation signal Vp to be active according to the auxiliary winding signal Vaux. Thus, when the induction current of the transformer 130 is less than a predetermined threshold, the PWM signal generating circuit 280 may configure the modulation signal Vp to be active so as to configure the driving circuit 290 to configure the current switch to be conducted.

The PWM signal generating circuit 280 is configured to operably configure the modulation signal Vp to be active or inactive (e.g., at high voltage level for the active status and at low voltage level for the inactive status) for configuring the driving circuit 290 to configure the conduction status of the current switch 150. The PWM signal generating circuit 280 may configure the current switch 150 to be intermittently conducted for providing suitable power to the load 190. Moreover, according to the configurations of the low voltage lockdown circuit 230, the voltage detecting circuit 250, the zero current detecting circuit 270 or other circuit blocks, the PWM signal generating circuit 280 may configure the modulation signal Vp to be at a predetermined voltage level or at one of predetermined voltage levels so as to configure the driving circuit 290 to configure the current switch 150 to be not conducted. The PWM signal generating circuit 280 may be realized with the comparator circuit, the error amplifier circuit or other suitable circuit structures. For example, the PWM signal generating circuit 280 may be realized with the error amplifier circuit for comparing a periodic signal (e.g., square wave signals, sinusoidal signals and triangle wave signals) and the reference signal generated by the reference signal generating circuit 210 for generating the modulation signal Vp.

The driving circuit 290 is configured to operably generate a switch signal Vsw according to the modulation signal Vp generated by the PWM signal generating circuit 280 for configuring the current switch 150 to be conducted or not conducted.

Figure 3:
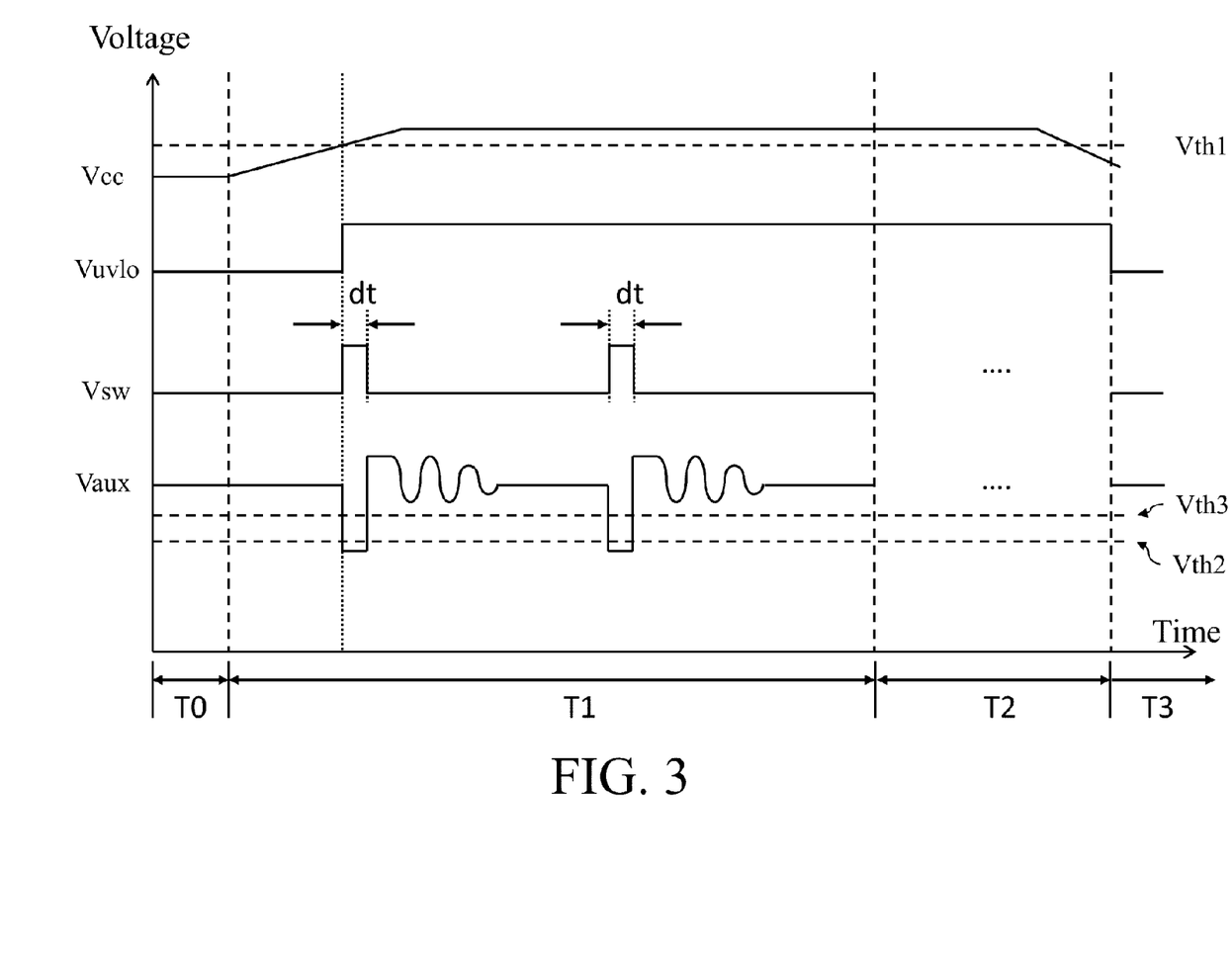
FIG. 3 shows a simplified timing diagram of several signals in the power converting circuit in FIG. 1 according to one embodiment of the present disclosure.

FIG. 3 shows a simplified timing diagram of several signals in the power converting circuit 100 in FIG. 1 according to one embodiment of the present disclosure. The operations of the power converting circuit 100 are further explained below with FIGS. 1-3.

In the embodiment in FIG. 3, the reference generating circuit 210 configures the first reference signal Vr1 to be a first predetermined value Vth1 and the second reference signal Vr2 to be a second predetermined value Vth2.

In the period of time T0, the input signal Vin is not in the suitable voltage range for the power converting circuit 100 to function correctly. The low voltage lockdown circuit 230 detects the input signal Vcc on the input voltage pin 172. When the magnitude of the input signal Vcc on the input voltage pin 172 is less than the magnitude of the first predetermined value Vth1, the low voltage lockdown circuit 230 configures the low voltage lockdown signal Vuvlo to be inactive (in this embodiment, the low voltage level represents inactive). The PWM signal generating circuit 280 configures the driving circuit 290 to configure the current switch 150 to be not conducted according to the low voltage lockdown signal Vuvlo.

In the period of time T1, the input voltage signal Vin increases so that the power converting circuit 100 may function correctly. The low voltage lockdown circuit 230 detects the input signal Vcc on the input voltage pin 172. When the magnitude of the input signal Vcc is greater than the magnitude of the first predetermined value Vth1, the low voltage lockdown circuit 230 configures the low voltage lockdown signal to be active (in this embodiment, the high voltage level represents active). The PWM signal generating circuit 280 configures the driving circuit 290 to configure the switch signal Vsw to be active for a predetermined time dt according to the low voltage lockdown signal Vuvlo. Thus, the switch signal Vsw may configure the current switch 150 to be conducted in the predetermined time dt. When the driving circuit 290 configures the current switch 150 to be conducted in the predetermined time dt, the voltage detecting circuit 250 detects the auxiliary winding signal Vaux on the multifunctional pin 174. When the voltage detecting circuit 250 detects the magnitude of the auxiliary winding signal Vaux on the multifunctional pin 174 is greater than the magnitude of the second predetermined value Vth2, the voltage detecting circuit 250 configures the PWM signal generating circuit 280 to configure the driving circuit 290 for configuring the current switch 150 to be intermittently conducted in the second period of time T2.

Figure 5:
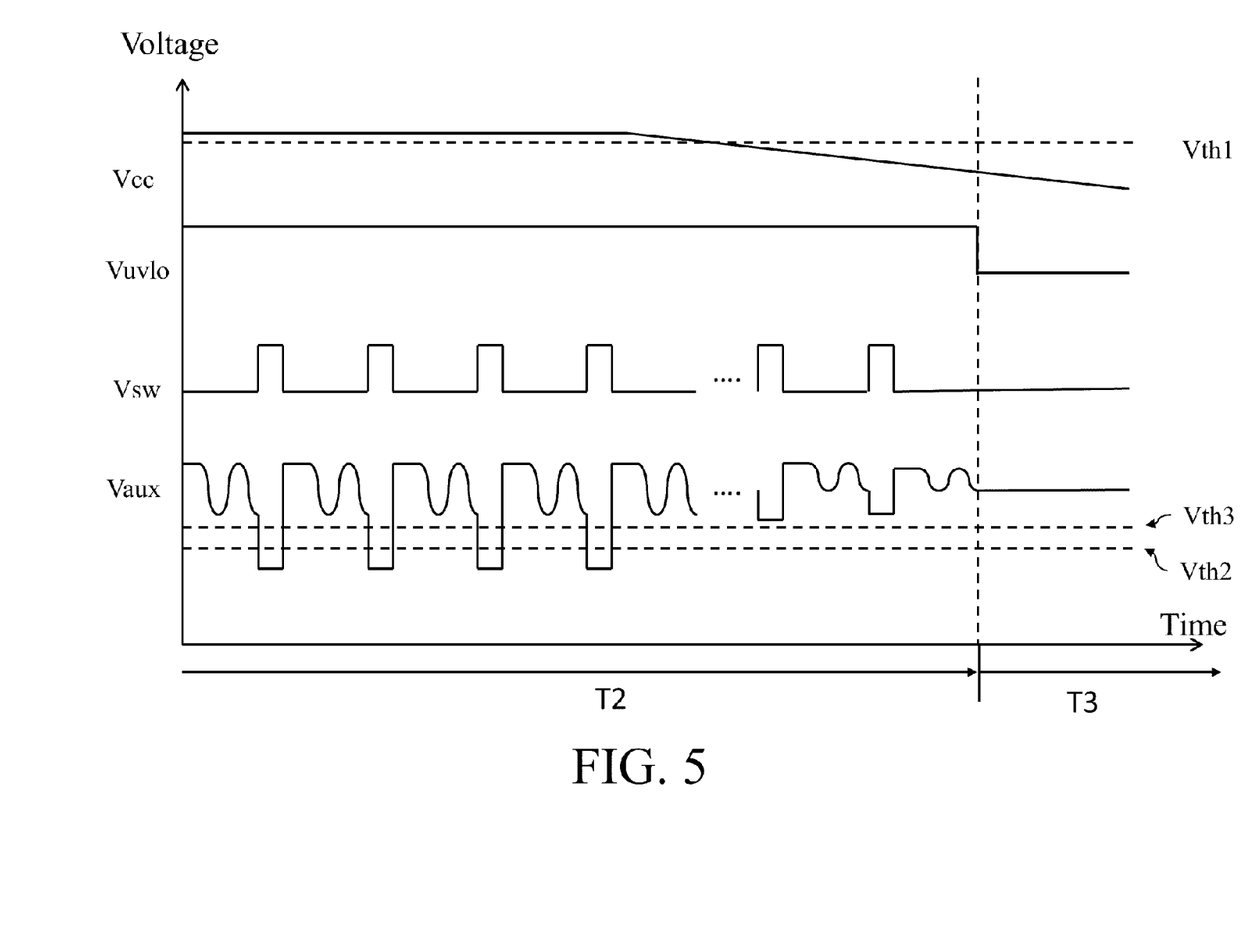
FIG. 5 shows a more detailed timing diagram of the signals in FIG. 3 in a certain period of time according to one embodiment of the present disclosure.

FIG. 5 shows a more detailed timing diagram of the signals in FIG. 3 in the periods of time T2 and T3 according to one embodiment of the present disclosure.

In the period of time T2, the driving circuit 290 configures the current switch 150 to be intermittently conducted for providing suitable voltage signals and/or current signals to the load 190. When the current switch 150 is not conducted, the zero current detecting circuit 270 detects the auxiliary winding signal Vaux on the multifunctional pin 174 so as to configure the PWM signal generating circuit 280 to configure the modulation signal Vp to be active. Thus, when the induction current of the transformer 130 is less than a predetermined threshold, the driving circuit 290 may configure to the current switch 150 to be active according to the modulation signal Vp.

In the period of time T2, when the voltage detecting circuit 250 detects the magnitude of the auxiliary winding signal Vaux on the multifunctional pin 174 is less than the magnitude of a third predetermined value Vth3, the voltage detecting circuit 250 configures the PWM signal generating circuit 280 to configure the driving circuit 290 to configure the current switch 150 to be not conducted in the third period of time T3.

Figure 4:
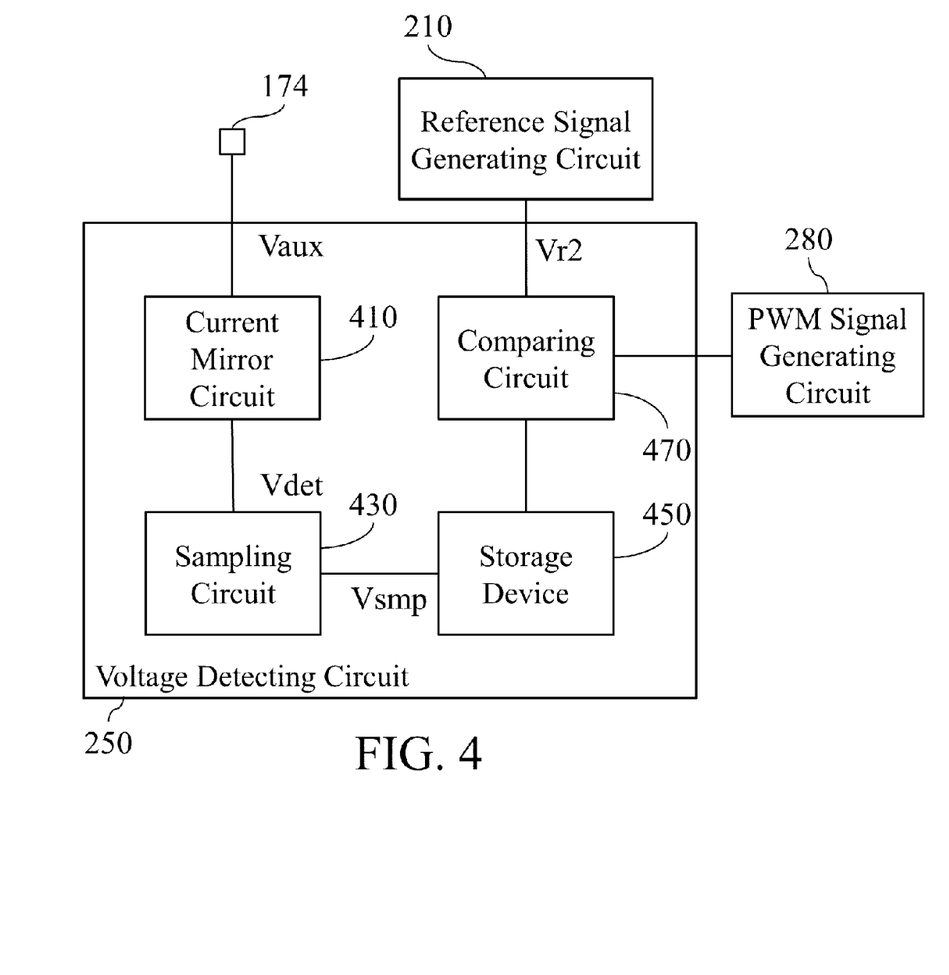
FIG. 4 shows a simplified functional block diagram of the voltage detecting circuit in FIG. 2 according to one embodiment of the present disclosure.

FIG. 4 shows a simplified functional block diagram of the voltage detecting circuit 250 in FIG. 2 according to one embodiment of the present disclosure. The voltage detecting circuit 250 comprises a current mirror circuit 410, a sampling circuit 430, a storage device 450 and a comparing circuit 470. For the purposes of conciseness and clear explanation, some components and connections of the voltage detecting circuit 250 are not shown in FIG. 4.

In this embodiment, the current mirror circuit 410 generates the signal Vdet in the voltage form according to the auxiliary winding signal Vaux in the current form received on the multifunctional pin 174. In other embodiments, when the auxiliary winding signal Vaux received on the multifunctional pin 174 is in the voltage form, the current mirror circuit 410 of the voltage detecting circuit 250 may be omitted.

The sampling circuit 430 samples the signal Vdet and stores the sampling values Vsmp to the storage device 450. The comparing circuit 470 compares the sampling values Vsmp stored in the storage device 450 and the second reference signal Vr2 so as to determine whether the input voltage signal Vin locates in the suitable voltage range.

The sampling circuit 430 may be realized with any suitable analog to digital circuit structures. The storage device 450 may be realized with suitable volatile and/or non-volatile storage device, e.g., registers and random access memory. The comparing circuit 470 may be realized with suitable comparator circuit structure with or without gain.

In the above embodiments, in the period of time T1, the low voltage lockdown circuit 230 may also configures the PWM signal generating circuit 280 to configure the driving circuit 290 to configure the current switch 150 to be conducted for the predetermined time dt for a plurality of times. After the voltage detecting circuit 250 detects the magnitude of the auxiliary winding signal Vaux on the multifunctional pin 174 is greater than the magnitude of the second predetermined value Vth2 for more than a first predetermined number, the voltage detecting circuit 250 configures the PWM signal generating circuit 280 to configure to driving circuit 290 to configure the current switch 150 to be intermittently conducted in the second period of time T2. Moreover, the voltage detecting circuit 250 utilizes the sampling circuit 430 to sample the auxiliary winding signal Vaux on the multifunctional pin 174 at different points of time for respectively generating multiple sampling values, and the comparing circuit 470 compares the multiple sampling values with the second predetermined value Vth2. Thus, it may be further ensured that the input voltage signal Vin locates in the suitable voltage range. Moreover, in other embodiments, after the voltage detecting circuit 250 detects the magnitude of the auxiliary winding signal Vaux on the multifunctional pin 174 is less than the magnitude of the third predetermined value Vth3 for more than a second predetermined number, the voltage detecting circuit 250 configures the PWM signal generating circuit 280 to configure to driving circuit 290 to configure the current switch 150 to be not conducted in the third period of time T3.

In the above embodiments, the reference signal generating circuit 210 may configure the second reference signal Vr2 to be the second predetermined value Vth2 in the first period of time T1 and configure the second reference signal Vr2 to be the third predetermined value Vth3 in the second period of time T2. Moreover, the second predetermined value Vth2 and the third predetermined value Vth3 may be configured to be the same or different according to different design considerations.

From the above description, the voltage detecting circuit 250 of the control circuit 170 may correctly determine whether the input voltage signal Vin locates in the suitable voltage range according to the auxiliary winding signal Vaux on the multifunctional pin 174. Moreover, the zero current detecting circuit 270 of the control circuit 170 may also determine whether the current switch 150 should be conducted according to the auxiliary winding signal Vaux on the multifunctional pin 174. Thus, when the control circuit 170 is realized with the integrated circuit, the voltage detecting circuit 250 and the zero current detecting circuit 270 may share the multifunctional pin 174 and ensure both circuit blocks function correctly.

Therefore, the number of pins of the integrated circuit package of the control circuit 170 of the power converting circuit 100 may be effectively reduced while the circuit blocks of the control circuit 170 may still function correctly. The control circuit 170 may therefore be realized with a smaller integrated circuit package with fewer pins, and the dimensions of the control circuit 170 may be effectively reduced.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit for configuring a power converting circuit, wherein the power converting circuit comprises a transformer and a current switch; a primary side of the transformer is configured to operably couple with an input voltage and the current switch; a secondary side of the transformer is configured to operably couple with a load; and the current switch is configured to operably couple with the transformer and a predetermined voltage level, wherein the control circuit comprising:

an input voltage pin configured to operably receive the input voltage;
a multifunctional pin configured to operably couple with an auxiliary winding side of the transformer;
a pulse-width-modulation (PWM) signal generating circuit configured to operably configure a conduction status of the current switch;
a low voltage lockdown circuit coupled with the input voltage pin and the PWM signal generating circuit;
a voltage detecting circuit coupled with the multifunctional pin and the PWM signal generating circuit; and
a zero current detecting circuit coupled with the multifunctional pin and the PWM signal generating circuit;
wherein when a magnitude of an input signal detected by the low voltage lockdown circuit on the input voltage pin is greater than a magnitude of a first predetermined value, the PWM signal generating circuit configures the current switch to be not conducted;
wherein in a first period of time, when the magnitude of the input signal detected by the low voltage lockdown circuit on the input voltage pin is greater than the magnitude of the first predetermined value, the low voltage lockdown circuit configures the PWM signal generating circuit to configure the current switch to be conducted for a predetermined period of time; and when an auxiliary winding signal detected by the voltage detecting circuit on the multifunctional pin is greater than a second predetermined value, the voltage detecting circuit configures the PWM signal generating circuit to configure the current switch to be intermittently conducted in a second period of time;
wherein in the second period of time, when the PWM signal generating circuit configures the current switch to be not conducted, the zero current detecting circuit configures the PWM signal generating circuit to configure the current switch to be conducted when a conduction current of the transformer is less than a predetermined threshold according to the auxiliary winding signal;
wherein in the second period of time, when the auxiliary winding signal detected by the voltage detecting circuit on the multifunctional pin is less than a third predetermined value, the voltage detecting circuit configures the PWM signal generating circuit to configure the current switch to be not conducted in a third period of time.

2. The control circuit of claim 1, wherein the low voltage lockdown circuit configures the PWM signal generating circuit to configure the current switch to be conducted for a plurality of times; and when the magnitudes of the auxiliary winding signals detected by the voltage detecting circuit on the multifunctional pin are greater than the magnitude of the second predetermined value for more than a first predetermined number, the voltage detecting circuit configures the PWM signal generating circuit to configure the current switch to be intermittently conducted in the second period of time.

3. The control circuit of claim 2, wherein the voltage detecting circuit further comprises:
   a sampling circuit configured to operably generate a plurality of sampling values respectively according to the auxiliary winding signals detected by the voltage detecting circuit on the multifunctional pin; and
   a comparing circuit configured to operably compare the sampling values with the second predetermined value.

4. The control circuit of claim 2, wherein the voltage detecting circuit further comprises:
   a voltage generating circuit configured to operably generate the second predetermined value in the first period of time and generate the third predetermined value in the second period of time;
   wherein the second predetermined value and the third predetermined value are different.

5. The control circuit of claim 1, wherein when the magnitudes of the auxiliary winding signals detected by the voltage detecting circuit on the multifunctional pin are less than the magnitude of the third predetermined value for more than a second predetermined number, the voltage detecting circuit configures the PWM signal generating circuit to configure the current switch to be not conducted in the third period of time.

6. The control circuit of claim 5, wherein the voltage detecting circuit further comprises:
   a sampling circuit configured to operably generate a plurality of sampling value respectively according to the auxiliary winding signals detected by the voltage detecting circuit on the multifunctional pin; and
   a comparing circuit configured to operably compare the sampling values with the third predetermined value.

* * * * *